FIG. I

June 11, 1963  M. A. FAGET ETAL  3,093,346
SPACE CAPSULE
Filed Oct. 16, 1959  4 Sheets-Sheet 3

INVENTORS
M.A. FAGET   W.S. BLANCHARD, JR.
A.J. MEYER, JR.   A.B. KEHLET
R.G. CHILTON   J.B. HAMMACK
C.C. JOHNSON, JR.

BY
ATTORNEYS

June 11, 1963  M. A. FAGET ETAL  3,093,346
SPACE CAPSULE
Filed Oct. 16, 1959  4 Sheets-Sheet 4
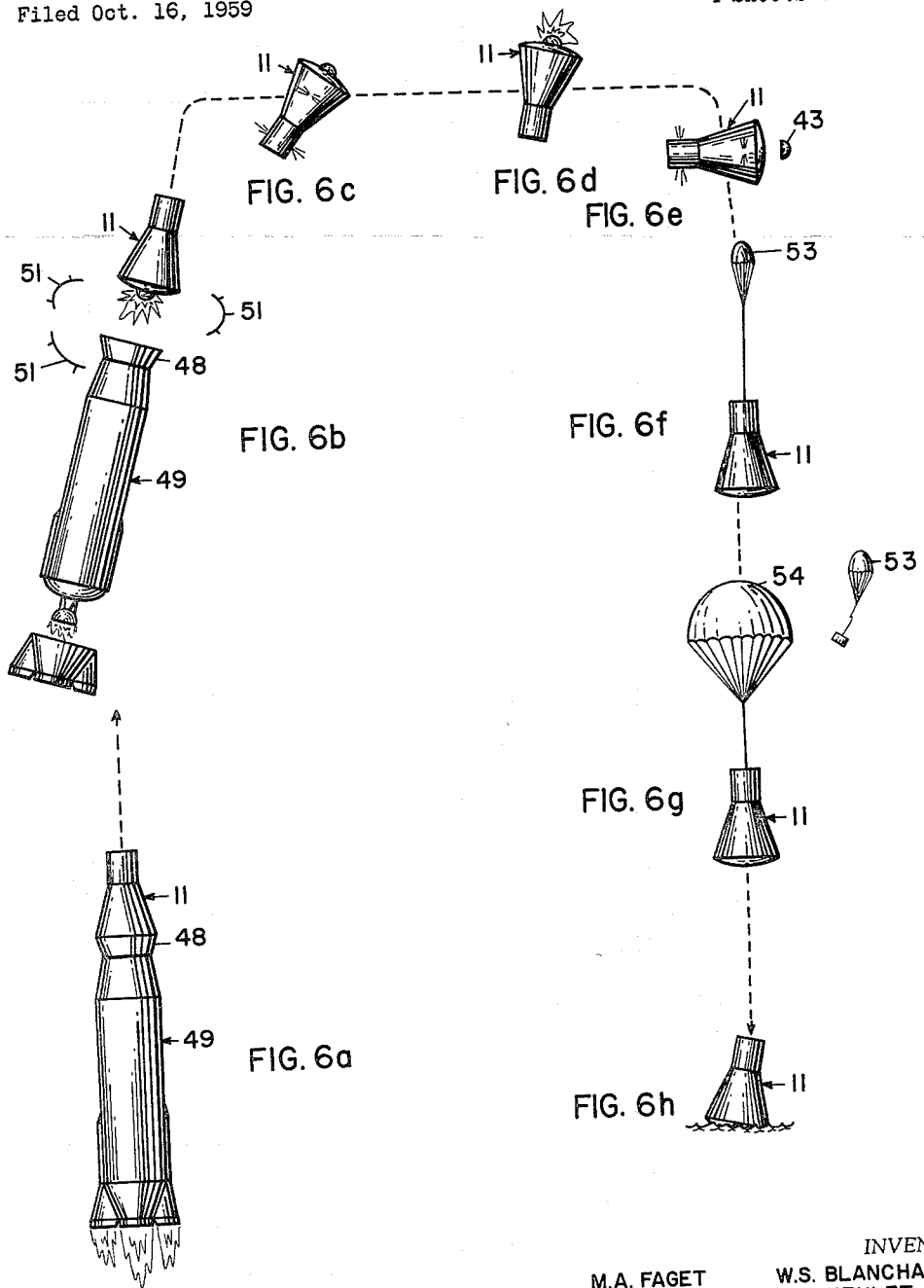
INVENTORS
M.A. FAGET  W.S. BLANCHARD, JR.
A.J. MEYER, JR.  A.B. KEHLET
R.G. CHILTON  J.B. HAMMACK
C.C. JOHNSON, JR.
BY
ATTORNEYS 3,093,346
SPACE CAPSULE
Maxime A. Faget and Andre J. Meyer, Jr., Newport News, Robert G. Chilton, Seaford, Willard S. Blanchard, Jr., and Alan B. Kehlet, Hampton, and Jerome B. Hammack and Caldwell C. Johnson, Jr., Newport News, Va., assignors to the United States of America as represented by the Administrator of National Aeronautics and Space Administration
Filed Oct. 16, 1959, Ser. No. 847,023
17 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to space vehicles, and more particularly to a manned capsule configuration capable of being launched into orbital flight and returned to the Earth's surface.

As an initial step in determining man's ability to adapt to and perform during space travel, a study of the effects of a space environment upon a human occupant of a capsule placed into a semi-permanent orbit about the Earth has been proposed. In order to quickly achieve the desired manned orbital flight a simple and reliable non-lifting capsule configuration which can be lifted into orbit by a missile motor and which follows a ballistic reentry path has been proposed.

Accordingly, it is an object of the present invention to provide a novel space satellite capable of achieving orbital flight.

Another object of this invention is to provide a simple and lightweight non-lifting type of manned space capsule capable of being launched into a semi-permanent orbital flight and returned to the Earth's surface.

Still another object of the instant invention is the provision of an aerial capsule configuration exhibiting a high degree of aerodynamic stability and structural integrity during the launching, orbiting and reentry phases of its flight trajectory.

A further object of the instant invention is to provide a space vehicle which provides protection for its occupant from the deleterious effects of large pressure differentials, high temperatures, micrometeorite collisions, high level acoustical noise, and severe inertial and impact loads.

A still further object of this invention is to provide a satellite capable of being selectively oriented while in flight.

Still another object of the instant invention is the provision of a new and improved micrometeorite, heat, and load sustaining enclosure structure for a space capsule.

According to this invention, the foregoing and other significant objects are attained by a frustro-conical shaped capsule provided with divers propelling means, aerodynamic drag means, and environmental shielding means.

A more complete appreciation of the invention and many of the attendant advantages thereof will be readily apparent as the same becomes better understood by reference to the following detailed description when considered in connection with the accompanying drawings wherein.

FIGS. 6a–6h illustrate, to a greatly reduced scale, the sequence of events in a normal space capsule launching, orbiting, and recovery flight operation.

Figure 1:
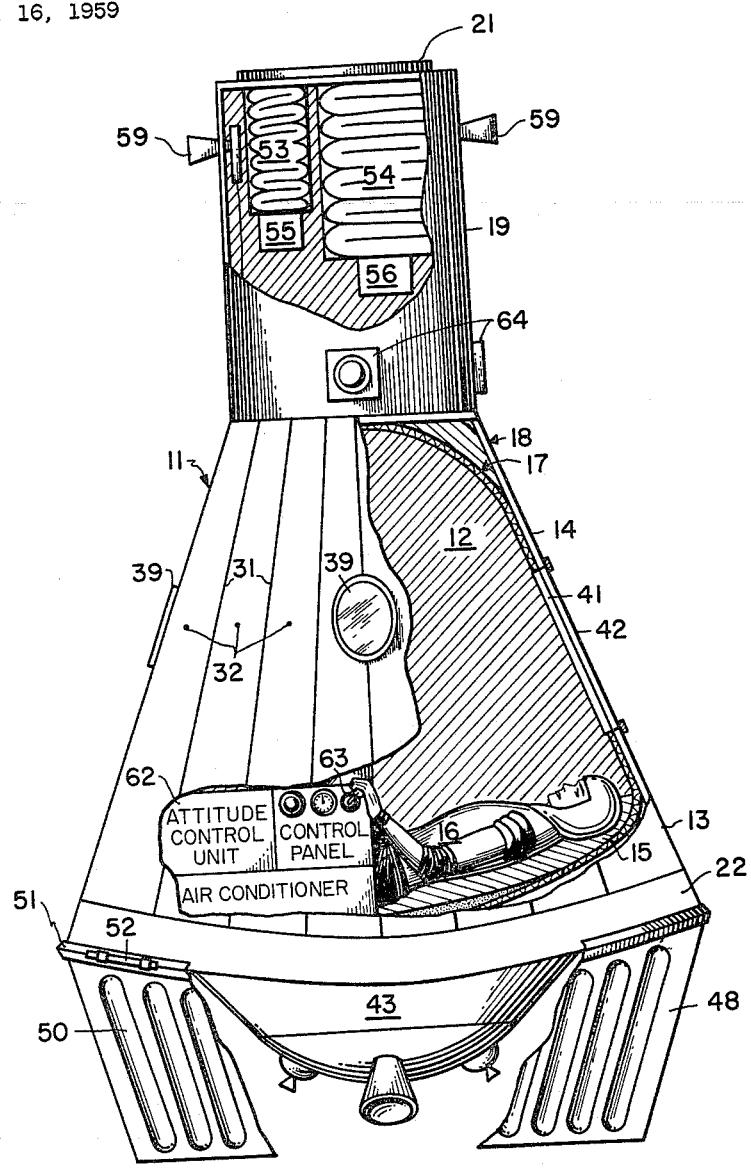
FIG. 1 is an elevational view, partly broken away, of the overall space capsule in accordance with the instant invention.

Referring now to the drawings wherein like reference numerals designate identical or corresponding parts throughout the several views, and more particularly to FIG. 1 whereon the space capsule according to the present invention is generally indicated by the reference numeral 11 and is shown as consisting of a man-sized compartment 12 having an extremely blunt forebody 13 and a frustro-conical afterbody 14. A contour couch 15, of the type disclosed in the copending application of Maxime A. Faget et al., Serial Number 840,983, filed September 18, 1959, NASA Case No. 118, now Patent Number 3,038,175 for supporting an occupant 16 may be securely placed in a low position within the forebody portion 13 of the compartment, or cabin 12. A low couch position is preferred to keep the center of gravity of the capsule 11 as close to the blunt end thereof as possible thereby to maintain a high degree of aerodynamic and hydrodynamic stability of the capsule.

The cabin 12 is formed of a sealed inner shell 17 which provides a pressure vessel for survival of the occupant 16, and a circumscribing separate outer structure 18. The outer structure 18 functions as a load carrying framework and, additionally, as a heat and micrometeorite shield for the pressure vessel 17. The contour of the outer structure 18 of the capsule is such as will provide a positive static stability for the overall capsule configuration throughout a reentry angle of attack range of approximately 0 to 180 degrees. Fixedly positioned atop the narrow afterbody 14 is an upright cylindrical canister 19 having a top cover plate 21 thereon. The entire underside surface of the blunt forebody 13, which is the leading reentry surface of the capsule, is covered by a heat protector member 22 for reducing the amount of heat applied to the pressure vessel 17. The member 22 may be composed either of a heat sink material, such for example as beryllium, or of an ablation heat shield material, such for example as glass-reinforced plastic.

Figure 2:
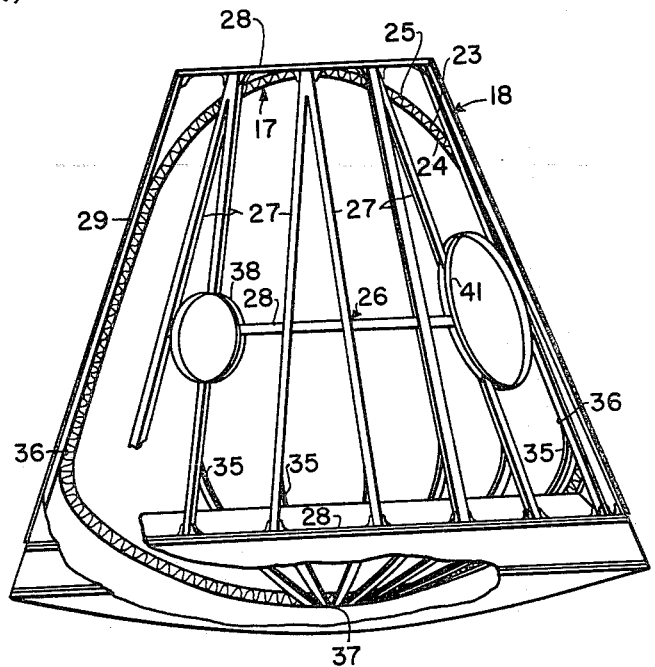
FIG. 2 is an elevational view of the structural framework of the space capsule of FIG. 1.
Figure 3:
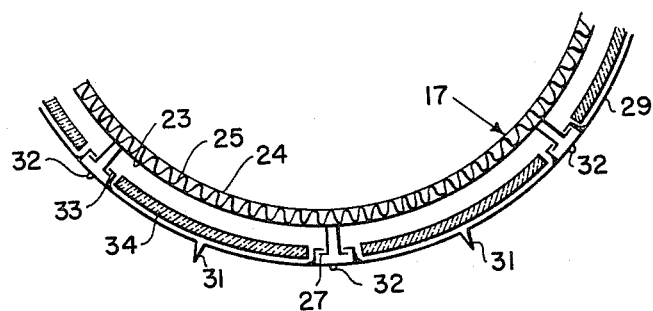
FIG. 3 is a detailed view of a portion of the capsule shell structure.

As more clearly shown in FIG. 2, the inner shell 17 consists of a sandwich material of two metallic plates 23 and 24, which may be of stainless steel, or the like, separated by a honeycomb stiffener 25. The outer structure 18 may be formed of a rigidly interconnected framework 26 of relatively closely spaced longitudinal stringer members 27 and transverse ring members 28. An external skin 29, preferably a continuous sheet of high temperature and heat resistant material, such for example as Inconel or a cobalt base alloy, covers the framework 26. To prevent thermal buckling of the external skin 29 by high frictional heating, omnidirectional expansion of the skin is provided for. One arrangement for accomplishing this result is shown in FIG. 3 wherein a number of longitudinal pleats 31 are formed in the skin to take up any expansion in the transverse direction and longitudinal expansion is allowed by rigidly securing the skin to the framework at only one intermediate position, such for example as along points 32 of a circumferential line, FIG. 1, atop a ring member 28. The points 32 are intermediate of adjacent stringer members. All other connections between the skin and framework of the outer structure 18 are made with slide clamps 33 engaging the stringer members 27. To further reduce heat and acoustic noise transmission to the cabin 12, bats of insulating material 34, such for example as Thermoflex, or the like, are placed in the space between the inner and outer shells. A basket configuration formed of a number of flexible metallic bands 35 one end of each of which is secured, as at 36, to individual stringers 27 and the other ends of which are commonly joined as at 37 provides a non-rigid support for the inner shell 17 within the outer structure 18. By this elastic support arrangement, the entire load sustained by the space capsule 11 will be borne entirely by the framework 26 and no stresses will be transmitted to the pressure vessel 17 to possibly rupture the air tightness thereof. To further assure the pressure integrity of the cabin 12, the inner and outer structures are provided with individual corresponding observation ports 38 and 39, respectively, and hatches 41 and 42, respectively.

Figure 4:
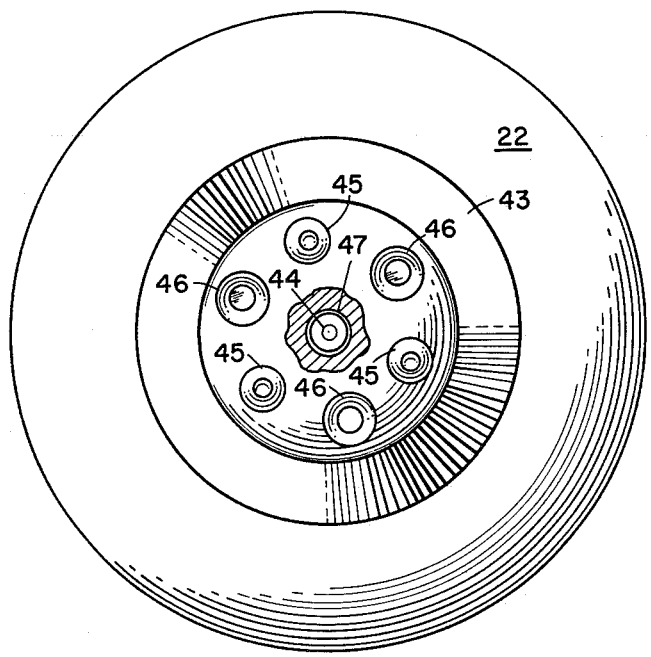
FIG. 4 is a bottom view of the space capsule.

As shown in FIG. 4, a circular container, or package, 43 is secured to the underside of heat shield 22 by an explosive bolt 44. The container houses three equidistantly spaced posigrade rockets 45 and three equidistantly spaced retrograde rockets 46, the purpose of each of which rockets will be more fully described hereinafter. The rockets are canted at a small angle to direct the thrust of the rockets through the center of gravity of the capsule 11. A compression coil spring 47 is included in the container 43 to force the container away from the capsule subsequent to the ignition of the explosive bolt 44. A lightweight pedestal 48 is detachably secured to the base of the capsule 11 for adapting the capsule to be seated upon the nose of a launching rocket motor 49. The adapter 48 may be composed of titanium material and stiffened by a plurality of longitudinal corrugations 50 formed therein. A segmented clamp ring 51 having one or more explosive bolts 52 disposed along its periphery normally secures the pedestal 48 to the capsule base.

In order to decelerate and stabilize the capsule during reentry, a drogue parachute 53 and a landing parachute 54 are stowed in the canister 19, as shown in FIG. 1. The drogue parachute 53 is preferably of the ribbon type and is ejected along with the cover plate 21 from the canister 19 by a mortar 55 into the airstream during the initial reentry period. The landing parachute 54 is preferably of the ringsail type and is adapted to be deployed subsequent to the deployment of the drogue parachute 53 by mortar 56. The shroud lines, or harnesses of the parachutes are detachably secured (not shown) to the framework 26 of the outer shell 18. In order to protect the parachute material from the deleterious effects of friction generated heat the canister 19 is preferably provided with a layer of heat insulating material.

Figure 5:
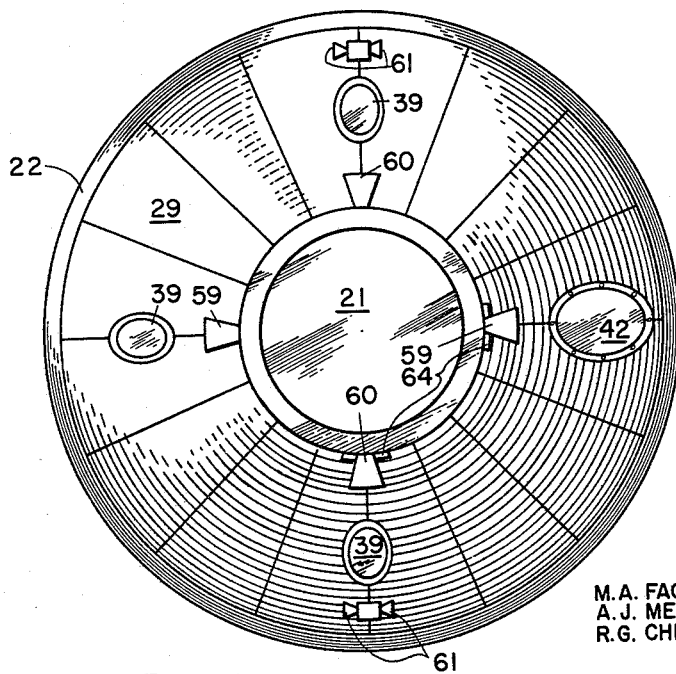
FIG. 5 is a top view of the space capsule.

For the purpose of properly orienting the capsule during the orbital and reentry phases of its flight, and also to eliminate tumbling thereof during the reentry phases, a reaction generating system consisting of a number of minute jets, preferably of the type utilizing a hydrogen peroxide fuel, are placed along the upper peripheral region of canister 19 and along the lower peripheral region of the cabin forebody 13, as more clearly shown in FIGS. 1 and 5 of the drawings. The upper row of jets consists of two pairs of jets 59 and 60 perpendicularly positioned relative to each other. The torque developed by jets 59 varies the pitch of the capsule while the torque developed by jets 60 varies the yaw of the capsule. The lower row of jets consists of a pair of jets 61 on diametrically opposite sides of the capsule and develops a torque which controls the roll of the capsule.

The operation of the minute torque jets 59, 60 and 61 can be regulated by selectively opening or closing feed valves (not shown) individual to each of the jet nozzles either by manually operated control means 16, or automatically by a stabilization and attitude control system 62. For manual control, the occupant can be provided with a hand control stick 63 which he selectively moves while observing the Earth's surface through the observation ports of the cabin until the capsule assumes a desired orientation relative to the Earth. For automatic operation, an attitude control system 62 may be provided which consists essentially of conventional vertical (roll pitch) and directional (roll yaw) gyros (not shown) for providing attitude information to a conventional calibrator (not shown) which in response to information provided by two horizon scanning devices 64 protruding from the canister 19 develops suitable output signals for controlling the operation of the reaction generating system to properly orient the capsule 11. In order to stop tumbling during the reentry phase of the capsule's trajectory, the control system 62 may also include a conventional three-axis rate gyro package (not shown) which is maintained inoperative while the capsule is orbiting. It is to be understood that although an attitude and stabilization control system similar to a conventional aircraft autopilot has been described, this description is only by way of example and not limitation, and other conventional control systems, such for example as an inertial navigation system, may also be employed. It is also to be understood that ignition of explosive bolts 44, 52, rockets 45, 46 and mortars 55, 56 can be regulated by the occupant's manual operation of a control panel, or unit, or the control panel may be provided with a conventional programmer for effecting a preselected sequential mode of ignitions.

For the purpose of providing a better understanding of the capsule of the present invention, the operation thereof during a normal flight trajectory will now be described in relation to FIG. 6.

At blastoff, FIG. 6a, the capsule 11 is carried skyward by the launching motor 49 until at a predetermined altitude, or velocity, suitable for orbital injection, the explosive bolts 52 are fired and the pedestal clamp ring 51 separated, FIG. 6b. Concurrently therewith, the posigrade rockets 45 are fired thereby to separate the capsule 11 from the launching motor 49. The attitude control system 62 immediately orients the capsule to a desired orbital attitude position with the blunt forebody 13 upward and leading and the occupant 16 sitting down with the Earth below, FIG. 6c. While the capsule is in orbit, the desired capsule alignment can be maintained by operation of the minute torque jet nozzles 59, 60 and 61 in response to the control signals developed by the attitude and stabilization control system 62. When reentry into the Earth's atmosphere is desired, the retrograde rockets 46 are fired, FIG. 6d, thereby to reduce the forward capsule velocity to an amount less than necessary to keep it in orbit. The explosive bolt 44 is ignited and the package 43 jettisoned from the capsule forebody by the action of compression spring 47, FIG. 6e. The torque producing jet nozzles are then operated either manually or automatically to orient the capsule 11 to the proper reentry attitude; i.e., heat shield 22 as the leading surface. When the capsule has descended to a preselected altitude, mortar 55 is fired and the drogue parachute 53 deployed, FIG. 6f. During this portion of the capsule reentry, oscillations of the capsule may be damped by the operation of the torque jet nozzles in response to the action of the three-axis rate gyro package of the attitude and stabilization control system 62. When the velocity of the capsule 11 has been suitably decreased by atmospheric drag, drogue parachute 53 is jettisoned and the main landing parachute 54 deployed by mortar 56 thereby to slowly lower the capsule to the Earth's surface for recovery. Upon landing, the main parachute 54 may be jettisoned. If the touchdown point is on water, the low center of gravity characteristic of the capsule design will result in a high hydrodynamic stability and the capsule will retain an upright position, FIG. 6h.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A space satellite comprising an air tight compartment, a shell structure surrounding said compartment, heat shielding means for said compartment, jettisonable means positioned adjacent said heat shielding means for generating acceleration and deceleration thrusts toward said heat shielding means in a direction substantially on a line through the center of gravity of the satellite, and means for generating torque thrusts to effect a desired attitude of the satellite.

2. A space satellite comprising a sealed chamber, a substantially frustro-conically shaped shell structure surrounding said chamber, heat shielding means covering a portion of said chamber, first reaction motor means positioned exteriorly adjacent said heat shielding means for developing acceleration thrust toward said heat shielding means in a direction substantially on a line through the center of gravity of the satellite, second reaction motor means for selectively developing torque thrusts to effect a desired orientation of the satellite, and multiple means for generating satellite deceleration.

3. A space vehicle comprising an air-tight man-sized compartment; a housing enclosing said compartment, said housing including a rigid framework of a substantially frustro-conical configuration, an omnidirectionally expandable shell covering said framework, and means for permitting limited and substantially unimpeded initial expansion of said expandable shell; means for non-rigidly supporting said compartment within said housing, heat shielding means affixed to the base of said housing; first reaction motor means for developing a thrust substantially along the longitudinal axis of said housing; second reaction motor means for developing a resultant thrust to selectively vary the attitude of the space vehicle; and means for generating deceleration of the space vehicle.

4. A capsule capable of being launched into orbit and returned to the Earth's surface comprising a casing having a substantially frustro-conical contour, an air-tight compartment supported within said casing, a heat shield having a substantially hemispheroidal contour disposed across the base of said casing, a container fixedly mounted atop said casing, first reaction motor means for developing a thrust to effect orbital injection of the capsule, second reaction motor means for selectively developing a resultant thrust to effect a desired capsule attitude while in orbit, third reaction motor means for developing a thrust to effect orbital termination and reentry initiation, and aerodynamic drag generating means normally stored in said container for effecting capsule deceleration during reentry upon deployment thereof.

5. A capsule according to claim 4 wherein said first and third reaction motor means are rocket motors.

6. A capsule according to claim 4, and including means for jettisoning said first and third reaction motor means.

7. A capsule according to claim 4, wherein said aerodynamic drag generating means comprises a drogue parachute, and a landing parachute.

8. A capsule according to claim 4, and including a pedestal detachably secured to said heat shield.

9. A capsule capable of being launched into orbit and returned to the Earth's surface comprising a casing having a blunt forebody and a narrow afterbody, a first container disposed on said afterbody, a sealed enclosure surrounded by said casing, means for non-rigidly supporting said enclosure within said casing, a high temperature shield covering the base of said casing, a second container secured to the underside of said shield, a first reaction motor means carried by said second container for developing a thrust to effect orbital injection of the capsule, second reaction motor means for intermittently developing a resultant thrust to selectively regulate the attitude of the capsule while in orbit, third reaction motor means carried by said second container for developing a thrust to effect orbital termination and reentry of the capsule, parachute means normally disposed in said first container for effecting capsule deceleration during reentry upon deployment thereof, and control means for sequential operation of said first, second and third reaction motor means and said parachute means.

10. A capsule according to claim 9, and including explosive bolt means normally securing said second container to said shield for effecting separation therefrom upon ignition thereof.

11. A capsule according to claim 9, and including mortar means disposed in said first container for effecting deployment of said parachute means.

12. A capsule according to claim 9, wherein said casing and said sealed enclosure each include corresponding visual observation means and doorway means.

13. A space vehicle comprising a sealed man-sized compartment, a rigid framework of a substantially frusto-conical configuration surrounding said compartment, means secured to said framework for elastically supporting said compartment, an omnidirectionally expandable sheet covering said framework, a heat protector secured to the base of said framework, a first container secured atop said framework, a plurality of ejectable parachutes stowed in said first container, a second container secured to the underside of said heat shield, a plurality of rocket motors disposed in said second container, a first set of jets positioned on diametrically opposite sides of said first container, a second set of jets positioned on diametrically opposite sides of said first container and perpendicularly to said first set of jets, a third set of jets positioned on diametrically opposite sides of said sheet proximate to said heat shield, and control means for operating divers ones of said first, second and third sets of jets to thereby vary the orientation of the space vehicle relative to the Earth's surface.

14. A space vehicle according to claim 13, wherein said control means includes horizon scanning means positioned in said first container to produce signals for control of said first, second and third sets of jets.

15. A space vehicle according to claim 13, wherein said heat protector is an ablation shield.

16. A space vehicle according to claim 13, and including mortar means for ejecting said plurality of parachutes.

17. A space vehicle according to claim 13, and including means for effecting jettisoning of said second container.

References Cited in the file of this patent

UNITED STATES PATENTS

| | | |
|---|---|---|
| 2,205,826 | Small | June 25, 1940 |
| 2,395,435 | Thompson et al. | Feb. 26, 1946 |
| 2,420,292 | Baer et al. | May 13, 1947 |
| 2,763,447 | Carrau | Sept. 18, 1956 |
| 2,835,548 | Baumann | May 20, 1958 |
| 2,865,579 | Caillette | Dec. 23, 1958 |
| 2,951,659 | Yoler | Sept. 6, 1960 |

OTHER REFERENCES

Rocket-Jet and Missile Engineering—by Constantin P. Lent, 1956, pages 40 and 61.